United States Patent
Momma et al.

(10) Patent No.: US 11,514,125 B1
(45) Date of Patent: Nov. 29, 2022

(54) MULTI-OBJECTIVE RANKING OF SEARCH RESULTS

(71) Applicant: Amazon Technologies, Inc., Seattle, WA (US)

(72) Inventors: Michinari Momma, Kirkland, WA (US); Alireza Bagheri Garakani, Seattle, WA (US); Yi Sun, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 549 days.

(21) Appl. No.: 16/706,084

(22) Filed: Dec. 6, 2019

(51) Int. Cl.
| | |
|---|---|
| *G06N 5/00* | (2006.01) |
| *G06N 20/20* | (2019.01) |
| *G06F 16/9538* | (2019.01) |
| *G06F 16/903* | (2019.01) |
| *G06F 7/22* | (2006.01) |
| *G06N 20/00* | (2019.01) |
| *G06Q 30/06* | (2012.01) |

(52) U.S. Cl.
CPC .......... *G06F 16/9538* (2019.01); *G06F 7/22* (2013.01); *G06F 16/90335* (2019.01); *G06N 5/003* (2013.01); *G06N 20/00* (2019.01); *G06N 20/20* (2019.01); *G06Q 30/0625* (2013.01)

(58) Field of Classification Search
CPC ... G06N 5/0003; G06N 20/20; G06F 16/9538
See application file for complete search history.

(56) References Cited

U.S. PATENT DOCUMENTS

2018/0300334 A1* 10/2018 Saha ................. G06N 20/00

OTHER PUBLICATIONS

Machine-generated transcript of "Gradient Boost Part 1: Regression Main Ideas" <URL: https//www.youtube.com/watch?v=3CC4N4Z3GJc.> 2019/03/25; 10 pgs.
Machine-generated transcript of "Gradient Boost Part 2: Regression Details" <URL:https://www.youtube.com/watch?v=2xudPOBz-vs.> Apr. 1, 2019; 15 pgs.
Machine-Generated Transcript of "Gradient Boost Part 3: Classification" <URL:https://www.youtube.com/watch?v=jxuNLH5dXCs.> Apr. 1, 2019; 11 pgs.
Machine-Generated Transcript of "Gradient Boost Part 4: Classification Details" https://www.youtube.com/watch?v=StVW5QWMXCw; Apr. 22, 2019; 22 pgs.

* cited by examiner

*Primary Examiner* — Shirley X Zhang
(74) *Attorney, Agent, or Firm* — K&L Gates LLP (57) ABSTRACT

Devices and techniques are generally described for ranking of search results based on multiple objectives. A first ranking for a plurality of search results is determined using a first machine learning model optimized for a first objective for ranking search results. A second objective for ranking search results is determined. A constraint is determined for the at least one second objective. The first machine learning model is iteratively updated to generate an updated machine learning model by minimizing a cost of the first objective subject to the constraint, wherein violations of the constraint are penalized using a penalty term. A second ranking for the plurality of search results is determined using the updated machine learning model. The search results of the second ranking are reordered relative to the search results of the first ranking.

20 Claims, 6 Drawing Sheets

Input: Number of trees $N$, number of leaves per tree $L$, learning rate $\eta$, AL parameter $\mu^t$. Initial Lagrange multiplier estimate $\alpha_0^t = 0, t = 1, \ldots, T$. Given initial BaseModel foreach $q \in Q$ do
  $f_0(x_i^q) = BaseModel(x_i^q), i \in I^q$  /* If BaseModel is empty, set $f_0(x_i^q) = 0$ */
end
for $n = 1$ to $N$ do
  foreach $q \in Q, i \in I^q$ do
    $\lambda_i^q = \lambda_i^{prev,q} + \sum_{t=1}^{T} \alpha_{n-1}^t \lambda_i^{t,q}, \rho_i^q = \rho_i^{prev,q} + \sum_{t=1}^{T} \alpha_{n-1}^t \rho_i^{t,q}$
  end
  $\{R_{nl}\}_{l=1}^{L}$                  /* Create an $L$ leaf tree on $\{(x_i^q, \lambda_i^q)\}_{q \in Q, i \in I^q}$ */
  $\gamma_{nl} = -\dfrac{\sum_{q \in Q, i \in R_{nl}} \lambda_i^q}{\sum_{q \in Q, i \in R_{nl}} \rho_i^q}$  /* Assign leaf values on Newton step estimate */
  foreach $q \in Q, i \in I^q$ do
    $f_n(x_i^q) = f_{n-1}(x_i^q) + \eta \sum_l \gamma_{nl} \delta(x_i^q \in R_{nl})$  /* Take step with learning rate $\eta$ */
  for $t = 1$ to $T$ do
    Compute cost $C^t(s)$ with $\{s_i^q = f_n(x_i^q)\}_{q \in Q, i \in I^q}$
    Update $\alpha_n^t$ via Eq. 18 or Eq. 19
  end
end
end

MULTI-OBJECTIVE RANKING OF SEARCH RESULTS

BACKGROUND

Machine learning models are often used to rank and order search results returned from search queries. Different objectives are often considered when determining how to rank search results. For example, relevance to the search query, historical behavior, business objectives, textual similarity to the search query, latency of responses, among other objectives, can be used to determine how to rank search results for a particular search query. Parameters of machine learning models used to rank search results are often hand-tuned in order to meet performance goals.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein is an Augmented Lagrangian-based method for search relevance ranking algorithms incorporating the multi-dimensional nature of search relevance and/or other constraints (such as business constraints). The various algorithms described herein can be used to implement relevance ranking models in production. The off-the-shelf solutions cannot handle such complex objectives and, therefore, engineers are left hand-tuning parameters that have only indirect impact on the objectives of interest when attempting to incorporate multiple objectives in a machine learning model. This process is tedious, time-consuming, and tends to generate sub-optimal solutions, especially when conflicting objectives are used. Embodiments described herein are designed to systematically solve the multi-objective problem in a constrained optimization framework to rank search results in a manner that satisfies multiple specified objectives (e.g., relevance objectives and/or business constraints). In an embodiment, a multi-objective model is implemented using a modified gradient boosting algorithm. Various embodiments described herein generate models that satisfy multi-objective ranking criteria much more efficiently than existing methods. In various embodiments, the techniques described herein result in significant reduction in model development time and allow for automation of model-refresh even with presence of several multi-objective criteria.

Relevance in information retrieval (IR) has been extensively studied and applied to various areas such as web search, product search and recommendation, etc. The concept of relevance is multi-dimensional, dynamic, and evolutional. For example, Mizzaro (How many relevances in information retrieval? *Interacting with Computers,* 10(3): 305-322, 1998) proposes four dimensions of relevance that include information resources, real information need from users, time, and components (topic/task/context). Product searches on the web, (e.g., through an e-commerce service), can be cast in such framework—as products being information resources, customers as real information need, time being latency, and components being shopping experiences (e.g., searching, browsing, clicking, and/or purchase). Customer engagement can be considered as an evolutionary aspect of relevance.

Searching and ranking of search results is a broad discipline that encompasses many different applications. For example, web searches, searching of research databases, product searches on e-commerce sites, etc. are example applications of search result ranking. The various techniques described herein are applicable generally to any search function. However, for ease of illustration, the techniques are described herein with respect to e-commerce product searches. However, it should be appreciated that the computer-implemented techniques described herein are equally applicable to ranking of search results in any search context that includes multiple ranking objectives.

In product searches, a ranking of products is often modeled using a customer's historical behavior. Typically, signals such as a customer's purchase, adding of an item to a virtual shopping cart and/or clicking on content are typically used as a target variable, and machine learning ranking models are tuned to optimize rankings based on such behaviors. To address the multi-dimensional nature of relevance, various features that represent relevance dimensions such as product freshness, product reputations, and/or customer membership can be used as input features to the ranking models. Other examples of relevance features that are useful in search ranking include product brands, eligibility, delivery speed, sales, customer reviews, the number of days since release, queries, context (e.g., query specificity and/or customer membership status), textual similarity between query and products, etc.

In an embodiment, business constraints represent additional objectives in production modeling of product searches. Some business constraints are derived from existing relevance metrics proven to be effective over time, while others are derived from relevance such as latency to ensure quick search responses. Still others may be strategic, such as minimum lift (%-gain) to consider experimentation/launch and/or avoidance of adult content for media-related searches. In another embodiment, the reduction of search defects, which are search results that do not match the query in various aspects (e.g., displaying a phone case when the customer has searched for a phone) can be considered as both a relevance objective and a business constraint, as reduction of search defects provides an improved customer experience, leading to better relevance, and enhances the quality of search results. Another example of a search defect is showing a zirconium ring in response to the query "diamond ring," which may give customers the impression that the search is non-functional, and/or may diminish the brand integrity of the e-commerce service.

As discussed above, relevance ranking modeling faces challenges of dealing with multiple relevance and/or business constraints. Relevance objectives and/or business constraints are typically referred to herein as "objectives." Current "off-the-shelf" machine learning solutions are unable to handle such multiple objectives in a systematic manner. Although the effect can be limited, one may try to employ over-weighting using exemplars and/or by query groups (QG), a set of query-product pairs for a session on a given day, and/or similar approaches, in order to influence the objective function in a desired way. Tuning of model weight values using combinatorial optimization to search for best combination of weightings is often used to jointly optimize for multiple objectives. However, such a trial-and-error approach becomes inhibitive as the number of objectives grows.

To address the issue, described herein is a constrained optimization method applied to the Gradient Boosting Tree (GBT) framework. Specifically, a constraint optimization is introduced in a ranking algorithm, such as the LambdaMART algorithm. LambdaMART is based on GBT and employs optimization on metrics such as the normalized cumulative discounted gains (NDCG) or the mean reciprocal rank (MRR)—which are methods of assessing ranking quality. The Newton step is adopted as a step-size, which is incorporated into a function value in GBT, and usually not iterated to refine the step.

Described herein is a practical approach to the constrained optimization on LambdaMART for relevance modeling in production. Production modeling typically involves constraints on model size and algorithm efficiency. To this end, adaptation of the Augmented Lagrangian (AL) method is proposed for multi-objective optimization of the ranking algorithm (e.g., LambdaMART). As described in further detail below, AL converts the original constrained problem into an unconstrained problem by adding penalty terms that penalize constraint violations. The Lagrange multipliers (e.g., dual variables) are estimated at each iteration and used to penalize constraint violations. The advantages of AL for incorporating into the GBT framework are the simplicity and smoothness of AL. The dual variables introduced using AL are iteratively optimized and fit well within the GBT iterations. The Boosting objective function is replaced by the unconstrained AL problem and the gradient is readily derived using the LambdaMART gradients. With the gradient and updates of dual variables, the optimization problem is jointly solved by iterating AL and GBT steps.

Most of the existing algorithms rely on heuristics, such as by weighting or by linearly combining objectives and/or models. Such existing algorithms require manual tuning of hyper-parameters, which becomes prohibitive as the number of objectives becomes large. By contrast, the various techniques described herein automatically yield models that satisfy minimal requirements over multiple objectives, alleviating the effort of hand-tuning of hyper-parameters, marking a clear improvement over the existing methods.

Figure 1:
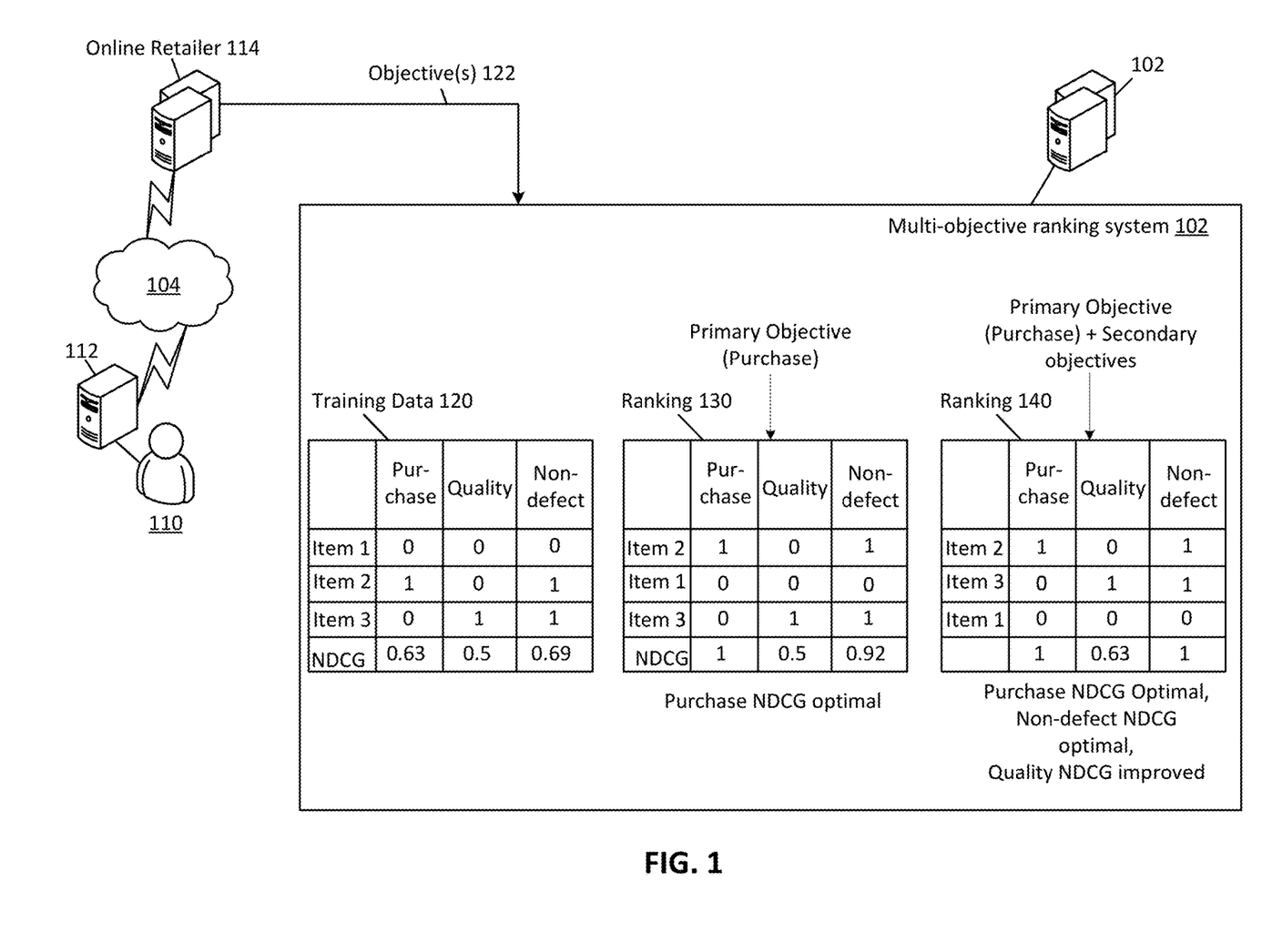
FIG. 1 is a block diagram illustrating example components of a system that may be used to perform multi-objective ranking of search results, according to various embodiments of the present disclosure.

FIG. 1 is a block diagram illustrating example components of a multi-objective ranking system 102, according to various embodiments of the present disclosure. In various examples, an online retail customer 110 may use a computing device 112 to enter a search query to search for products available via an online retailer 114 (e.g., through one or more servers of an e-commerce service). As previously described, although ranking of product search queries are described in many of the following examples, the ranking techniques described herein are equally applicable to any computer-implemented search systems. In various examples, network 104 is a wide area network, such as the Internet, while in other embodiments, the network 104 is a local area network (LAN) over which search queries are sent and search results are returned. In some further embodiments network 104 is a combination of the Internet and a LAN.

In the example embodiment depicted in FIG. 1, online retail customer 110 has performed a search using an e-commerce service of online retailer 114 for a product and/or product category. Multi-objective ranking system 102 has trained a first machine learning model using training data 120 to generate ranking 130 and a second machine learning model using training data 120 to generate ranking 140. Rankings 130, 140 represent a ranked list of search results based on a query from online retail customer 110.

Training data 120 describes three items (Item 1, Item 2, and Item 3) with attributes for Purchase (e.g., 1 for previously purchased, 0 for not previously purchased), Quality (e.g., 1 for a quality above a threshold quality score, 0 for quality below the threshold quality score), and non-defective (e.g., 0 for a search result deemed defective relative to the query and 1 for a non-defective result for the query). The NDCG for the current ranking (Item 1, followed by Item 2, followed by Item 3) is shown below each objective. NDCG is a metric of the ranking algorithm's effectiveness with 0 being a poor result and 1 being an optimal result.

Ranking 130 represents a ranking optimized for purchase alone. In other words, the ranking model for ranking 130 ranks products that have been previously purchased by online retail customer 110 (or by other similar customers) higher relative to products that have not been purchased previously. Multi-objective ranking system 102 optimizes using a cost function based on the purchase objective alone in ranking 130. Accordingly, NDCG is optimal for purchase in ranking 130. Ranking 130 ranks Item 2 above Items 1 and 3, as Item 2 has been previously purchased. Ranking 130 may be generated using any desired ranking algorithm (e.g., bipartite ranking, k-partite ranking, gradient boosting trees, etc.) optimized for purchase. Objective(s) may be sent from online retailer 114 to the multi-objective ranking system 102.

Ranking 140 represents a ranking with a primary objective of purchase, but with secondary objectives of product quality and non-defective searches. As described in further detail below, the Augmented Lagrangian (AL) technique is used to constrain secondary objectives by penalizing constraint violations. For example, if a baseline ranking model has a cost A associated with the product quality, an upper bound may be set for product quality that is equal to A, 0.9 A, 0.85 A, (or some other percentage of the cost A, as desired). The AL technique replaces the constrained optimization problem (e.g., the optimization of model with respect to the primary objective and the secondary objectives) with a series of unconstrained problems where a penalty term $\alpha$ is applied to the secondary objectives. The penalty term is used to penalize constraint violations when the constraint exceeds the upper bound. The AL technique is described in further detail below. The cost function of the primary objective may be minimized in a way that optimizes for the secondary objectives. Accordingly, as shown in ranking 140, purchase (the primary objective) and non-defect (a secondary objective) are NDCG optimal, while quality (a secondary objective) has been improved from 0.5 NDCG in ranking 130 to 0.63 NDCG in ranking 140.

Figure 2:
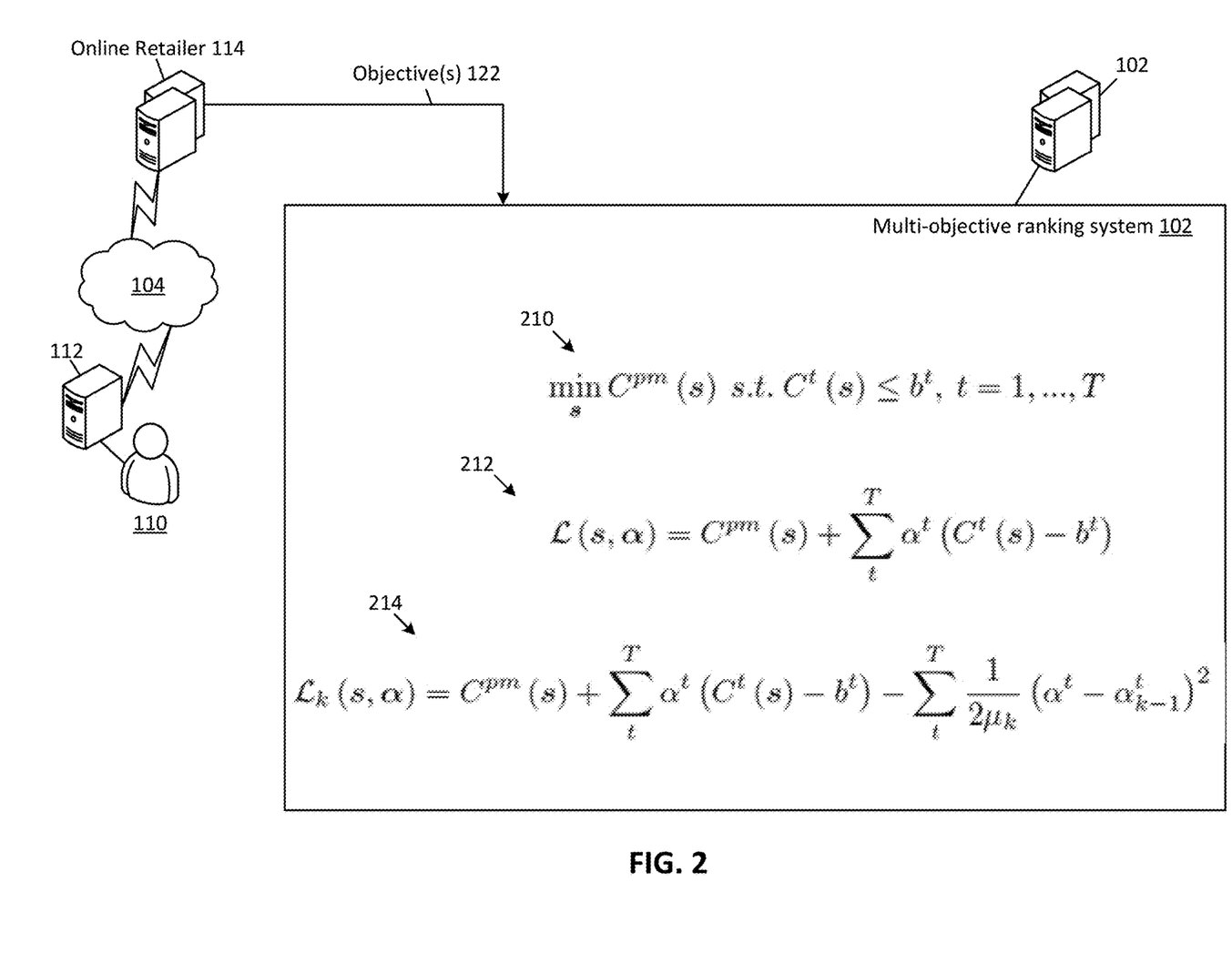
FIG. 2 depicts the optimization problem to be solved in order to update the ranking algorithm, in accordance with various embodiments of the present disclosure.

FIG. 2 depicts the optimization problem 210 to be solved in order to update the ranking algorithm, in accordance with various embodiments of the present disclosure. The optimization problem 210 is a constrained problem that is solved to minimize the cost of the model subject to various objectives (e.g., objective(s) 122 specified by online retailer 114). $C^{pm}(s)$ is the cost function of the model currently being trained with respect to the primary objective (e.g., purchase). The cost $C^{pm}(s)$ is minimized subject to the secondary objectives t=1, ..., T (e.g., relevance objectives and/or business objectives). $C^t(s)$ is the cost of a particular objective (e.g., a particular constraint) t. $b^t$ is the upper bound for a particular objective t. $b^t$ is set by determining the cost $C^t(s)$ for the current model and selecting $b^t$ based on the current cost $C^t(s)$. For example, if the current cost $C^t(s)$ is acceptable for the objective t, $b^t$ can be set to the current cost value $C^t(s)$. In another example, if a 10% improvement of the current cost $C^t(s)$ is desired, the upper bound $b^t$ may be set as $b^t=0.9C^t(s)$, and so on.

Equation 212 is the Lagrangian function of the optimization problem 210, where $\alpha=[\alpha^1, \ldots, \alpha^T]$ is a function of penalty terms for each objective t. As described in further detail below, $\alpha$ penalizes constraint violations (e.g., when $C^t(s) > b^t$). If a constraint ($C^t(s) < b^t$) for an objective t is already satisfied, the term $C^t(s)-b^t$ of equation 212 is negative. In such a scenario, $\alpha^t$ is set to 0 for the current iteration k, so that the cost for that objective t does not contribute to the overall cost defined by optimization problem 210. However, if the constraint is not satisfied, and the term $C^t(s)-b^t$ of equation 212 is positive, $\alpha^t$ is maximized for the current iteration such that the cost for the objective t contributes to the overall cost defined by optimization problem 210 (thereby penalizing the total cost due to the constraint violation).

Equation 214 adds a new term $$\sum_t^T \frac{1}{2\mu_k}(\alpha^t - \alpha_{k-1}^t)^2$$

which is used to alleviate non-smoothness between iterations and to prevent $\alpha$ from going to infinity. $\mu$ is a constant and is used along with $\alpha_{k-1}^t$ to provide proximal minimization to smooth the optimization. $\alpha_{k-1}^t$ is a solution in the previous iteration and a constant in the current iteration k.

$\alpha$ is defined for each training iteration k and is calculated by taking the first order partial derivatives of equation 214 with respect to s and $\alpha$ (e.g., by calculating the gradient of the Lagrangian function) and the second order derivative with respect to s and evaluating at the stationary condition $$\frac{\partial \mathcal{L}_k}{\partial \alpha^t} = 0$$

to derive the formula for $\alpha$ (equation 18 below), as described in further detail below.

Formulation and Algorithm

As a method for production modeling, there are some requirements in design: latency in scoring and the computational cost in training. For latency, it may be desirable to avoid construction of a large number of gradient boosting trees, as that may translate into latency degradation. For computational cost, it may be desirable to avoid a large number of iterations, as the objective function evaluation can be computationally expensive in search applications. Therefore, nested iterations may be avoided, as done in GBT on step-size optimization.

LambdaMART Objective and Gradient

Described below are the LambdaMART formulations. Q is a set of queries Q={q} and $I^q$ is an index set of documents (e.g., a product in product search) associated with each query. A document is denoted by $d_i$ with an index $i \in I^q$. A set of pairs of document indices is defined by $P^q=\{(i,j)\}$ with the relation $R_i \triangleright^q R_j$: $d_i$ is more relevant to $d_j$ for a given query q. In this embodiment, there is a single cost function to optimize, referred to as primary cost. Given a relevance model f, for a query and a document, a score of the document is computed as a function of its input features (that could be query dependent): $s_i^q = f(x_i^q)$. A probability of the relevance relationship is modeled by a sigmoid function:

$$\text{Prob}(R_i \triangleright^q R_j) = \text{Prob}\left((i,j) \in P^q \equiv \frac{1}{1+e^{-\sigma(s_i^q - s_j^q)}}\right) \quad (1)$$

where $\sigma$ is a parameter to determine the shape of the sigmoid function. LambdaMART is based on the pairwise cost that is based on the cross-entropy with a rank-dependent weight to incorporate importance of high ranks. For a pair $(i,j) \in P^q$, the cross entropy primary is given by:

$$e^{pm}(s_i^q, s_j^q) = |\Delta Z_{i,j}^{pm,q}| \log(1+e^{-\sigma(s_i^q - s_j^q)}) \quad (2)$$

where $\Delta Z_{i,j}^{pm,q}$ is the difference of a metric such as NDCG between the (i,j) pair in one order and one that is flipped. For a metric like NDCG, relevant documents in higher ranked position is assigned a high value and that in lower ranked position is assigned a low value. Therefore, the weight $\Delta Z_{i,j}^{pm,q}$ tends to be large when a high ranked position is involved in the pair. For a query, the total cost $c(s^q)$ with $s^q$ being a vector containing all documents for the query, i.e., $s^q = [S_1, \ldots, S_{I_q}]$, is given by:

$$c^{pm}(s) = \Sigma_{q \in Q(i,j)} p_q c^{pm}(s_i^q, s_j^q)) \quad (3)$$

The primary objective function of LambdaMART is a sum over all queries:

$$C^{pm}(s) = \Sigma_{q \in Q(i,j) \in P^q} \Sigma c^{pm}(s_i^q, s_j^q) = \Sigma_{q \in Q} c^{pm} \quad (4)$$

where s is a concatenated vector containing scores for all queries: $\{s^q | q \in Q\}$.

Boosting in LambdaMART is based on the GBT, which generates linear combination of base functions that are the decision trees, which are learned to fit the gradient. Typically, in GBT, once a tree is constructed, the function value of each leaf is computed by an estimate of the Newton step for the node. More formally, at an $n^{th}$ iteration, leaf nodes $\{R_{nl}\}_{l=1}^L$, where L is the number of leaves of a tree, are generated by CART for given input features of query and documents, and the gradient as a target:

$$\left(x_i^q, g_n(f(x_i^q))\right),$$

$q \in Q$, $i \in I^q$, with $g_n$ being a gradient with respect to a score.

The function value for each node is given as:

$$\gamma_{nl} = -\frac{\sum_{x_i^q \in R_{nl}} \partial^2 C^{pm}/\partial s_i^q}{\sum_{x_i^q \in R_{nl}} \partial C^{pm}/\partial (s_i^q)^2} \quad (5)$$

Therefore, the score, or the prediction function is given as follows:

$$s_i^q = f(x_i^q) = f_0(x_i^q) + \sum_{n=1}^{N}\sum_{l=1}^{L} \gamma_{nl} \delta(x_i^q \in R_{nl}) \quad (6)$$

where $f_0(x_i^q)$ is an initial base function that could be provided by prior knowledge/needs and $\delta$ is the Kronecker delta. To derive the gradient, the query cost may be restated as:

$$c^{pm}(s^q) = \sum_{i \in Iq} c^{pm}(s_i^q) = \sum_{i \in Iq}(\sum_{j:(i,j) \in p^q} c^{pm}(s_i^q, s_j^q) + \sum_{j:(i,j) \in p^q} c^{pm}(s_i^q, s_j^q)) \quad (7)$$

with $c^{pm}(s_i^q) \equiv \sum_{j:(i,j) \in p^q} c^{pm}(s_i^q, s_j^q) + \sum_{j:(i,j) \in p^q} c^{pm}(s_i^q, s_j^q)$. The first term computes the pairwise cost between $d_i$ and others that are less relevant than $d_i$. The second term computes the pairwise cost between $d_i$ and others that are more relevant than $d_i$. The approximated gradient used by LambdaMART is readily computed by taking derivative with respect to the current score.

$$\frac{\partial c^{pm}(s_i^q)}{\partial s_i^q} = \sum_{j:(i,j) \in p^q} \frac{-\sigma |\Delta Z_{i,j}^{pm,q}|}{1 + e^{\sigma(s_i^q - s_j^q)}} + \sum_{j:j,i) \in p^q} \frac{-\sigma |\Delta Z_{i,j}^{pm,q}|}{1 + e^{\sigma(s_i^q - s_j^q)}} \quad (8)$$

By defining $$\lambda_i^{pm,q} \equiv \frac{\partial c_q^{pm}}{\partial s_i}$$

and $$\lambda_{ij}^{pm,q} \equiv \frac{-\sigma |\Delta Z_{i,j}^{pm,q}|}{1 + e^{\sigma s_i^q - s_j^q}},$$

we have the gradient formula in terms of $\lambda$'s.

$$\lambda_i^{pm,q} = \sum_{j:(i,j) \in p^q} \lambda_{ij}^{pm,q} - \sum_{j:(j,i) \in p^q} \lambda_{ji}^{pm,q} \quad (9)$$

Similarly, the second order derivative, defined as $p_i^{pm,q} \equiv \partial^2 c^{pm}/\partial (s_i^q)^2$ is given as follows:

$$p_i^{pm,q} = \sigma^2 \sum_{j:(i,j) \in p^q} |\Delta Z_{i,j}^{pm,q}| p_{ij}^{pm,q} (1 - p_{ij}^{pm,q}) - \sigma^2 \sum_{j:(i,j) \in p^q} |\Delta Z_{i,j}^{pm,q}| p_{ji}^{pm,q} (1 - p_{ji}) \quad (10)$$

given the definition $$p_{ij}^{pm,q} \equiv \frac{1}{\left(1 + e^{\sigma(s_i^q - s_j^q)}\right)}.$$

Constrained Optimization to Accommodate Multiple Objectives

In terms of utility, the constraints can be written as: $U^t((s)) \geq U_0^t$, $t=1, \ldots, T$, where T is the number of constraints and $U_0^t$ is the baseline utility (objective) that is required to be met. Just like NDCG or MRR, the utilities could be any complicated or non-smooth function and we need to use a surrogate function to fit it into the optimization framework. For example, suppose a minimum criteria in NDCG is set. In this case, LambdaMART costs can be used for NDCG and the cost is set to no greater than the given upper-bound (UB) b, i.e., $C^t(s) \leq b^t$, $t=1, \ldots, T$. Therefore, the optimization problem is written as:

$$\min_s C^{pm}(s) \text{ s.t. } C^t(s) \leq b^t, t = 1, \ldots, T \quad (11)$$

The Lagrangian is written by:

$$\mathcal{L}(s, \alpha) = C^{pm}(s) + \sum_{t}^{T} \alpha^t (C^t(s) - b^t) \quad (12)$$

where $\alpha = [\alpha^1, \ldots, \alpha^T]$ is a vector of dual variables. The constrained problem is solved by minimizing with respect to the primal variables s and maximizing with respect to the dual variables $\alpha$.

Incorporating Augmented Lagrangian Method in Boosting

AL iteratively solves the constraint optimization while alleviating possible non-smoothness in a in the procedure of satisfying the constraints. In the above-described problem, the Lagrangian at iteration k is written as:

$$\mathcal{L}_k(s, \alpha) = C^{pm}(s) + \sum_{t}^{T} \alpha^t (C^t(s) - b^t) - \sum_{t}^{T} \frac{1}{2\mu_k} (\alpha^t - \alpha_{k-1}^t)^2 \quad (13)$$

where $\alpha_{k-1}^t$ is a solution in the previous iteration and a constant in the current iteration k. $\mu_k^t$ is a sufficiently large constant associated with each dual variable $\alpha$. Note that the last term is newly added as compared with Eq. 12 and provides proximal minimization with iterates $\alpha_{k-1}^t$ to make the optimization smooth. Equation 13 may represent the Augmented Lagrangian function.

The Lagrangian is maximized with respect to $\alpha \geq 0$ and minimized with respect to s:

$$\max_{\alpha \geq 0} \min_s \mathcal{L}_k(s, \alpha) \quad (14)$$

The first order derivatives are given as follows:

$$\frac{\partial \mathcal{L}_k}{\partial \alpha_i^q} = C^t(s) - b^t - \frac{1}{\mu_k^t}(\alpha^t - \alpha_{k-1}^t) \quad (15)$$

$$\frac{\partial \mathcal{L}_k}{\partial s_i^q} = \frac{\partial C^{pm}(s)}{\partial s_i^q} + \sum_t \alpha^t \frac{\partial C^t(s)}{\partial s_b^q} = \quad (16)$$

$$\sum_{q \in Q, i \in Iq} \left( \lambda_i^{pm,q} + \sum_t \alpha^t \lambda_t^{t,q} \right) = \sum_{q \in Q, i \in Iq} \lambda_i^q$$

where $\lambda_i^q \equiv \lambda_i^{pm,q} + \Sigma_t \alpha^t \lambda_i^{t,q}$. Similarly, by defining $p_i^q \equiv p_i^{pm,q} + \Sigma_t \alpha^t p_i^{t,q}$, the second order derivative with respect to score is:

$$\frac{\partial^2 \mathcal{L}_k}{\partial (s_i^q)^2} = \frac{\partial^2 C^{pm}(s)}{\partial (s_i^q)^2} + \sum_t \alpha^t \frac{\partial^2 C^t(s)}{\partial (s_i^q)^2} = \quad (17)$$

$$\sum_{q \in Q, i \in I^q} \left( p_i^{pm,q} + \sum_t \alpha^t p_i^{t,q} \right) = \sum_{q \in Q, i \in I^q} p_i^q$$

From stationary condition $$\frac{\partial \mathcal{L}_k}{\partial \alpha^t} = 0,$$

the update formula for $\alpha$ is obtained for each iteration:

$$\alpha_k^t = \max(0, \mu_k^t (C^t(s) - b^t) + \alpha_{k-1}^t) \quad (18)$$

At an iteration k, if the constraint t is not satisfied (i.e., $C^t(s) > b^t$), then $\alpha_k^t > \alpha_{k-1}^t$, which means the Lagrange multiplier $\alpha^t$ increases unless the constraint is already satisfied. Intuitively, it can be considered as weighting that is adjusted each iteration to overweight unsatisfied constraint that is associated the objective to be improved.

Note, if a constraint should be strictly satisfied at optimality, $\alpha^t$ should take value 0 to maximize the Lagrangian. If a constraint should be satisfied with equality, $\alpha^t$ can take a finite value. If the solution is restricted to the former case, the penalty variable a is set to 0 whenever the constraint is satisfied:

$$\alpha_k^t = \begin{cases} 0, & \text{if } C^t(s) - b^t < 0 \\ u_k^t (C^t(s) - b^t) + a_{k-1}^t, & \text{otherwise} \end{cases} \quad (19)$$

Eq. 18 is referred to as an original AL update and Eq. 19 is referred to as an accelerated update.

One interpretation of the AL method is a penalty method on constraint violations. For illustrative purposes, the stationary condition Eq. 18 may be inserted into Eq. 13, yielding $$\mathcal{L}_k(s, \alpha) = \quad (20)$$

$$C^{pm}(s) + \sum_{t \in \{\alpha^t > 0\}} \alpha^t (C^t(s) - b^t) + \sum_{t \in \{\alpha^t > 0\}} \frac{\mu_k^t}{2} (C^t(s) - b^t)^2 + const.$$

Accordingly constraint violations associated with $\alpha^t > 0$ are penalized using the quadratic function. Therefore, setting a high value for $\mu_k^t$ imposes the constraint more strictly. On the other hand, setting too high a value may introduce non-smoothness which may be non-beneficial using AL techniques.

An Approach to Augmented Lagrangian with LambdaMART

Figure 3:
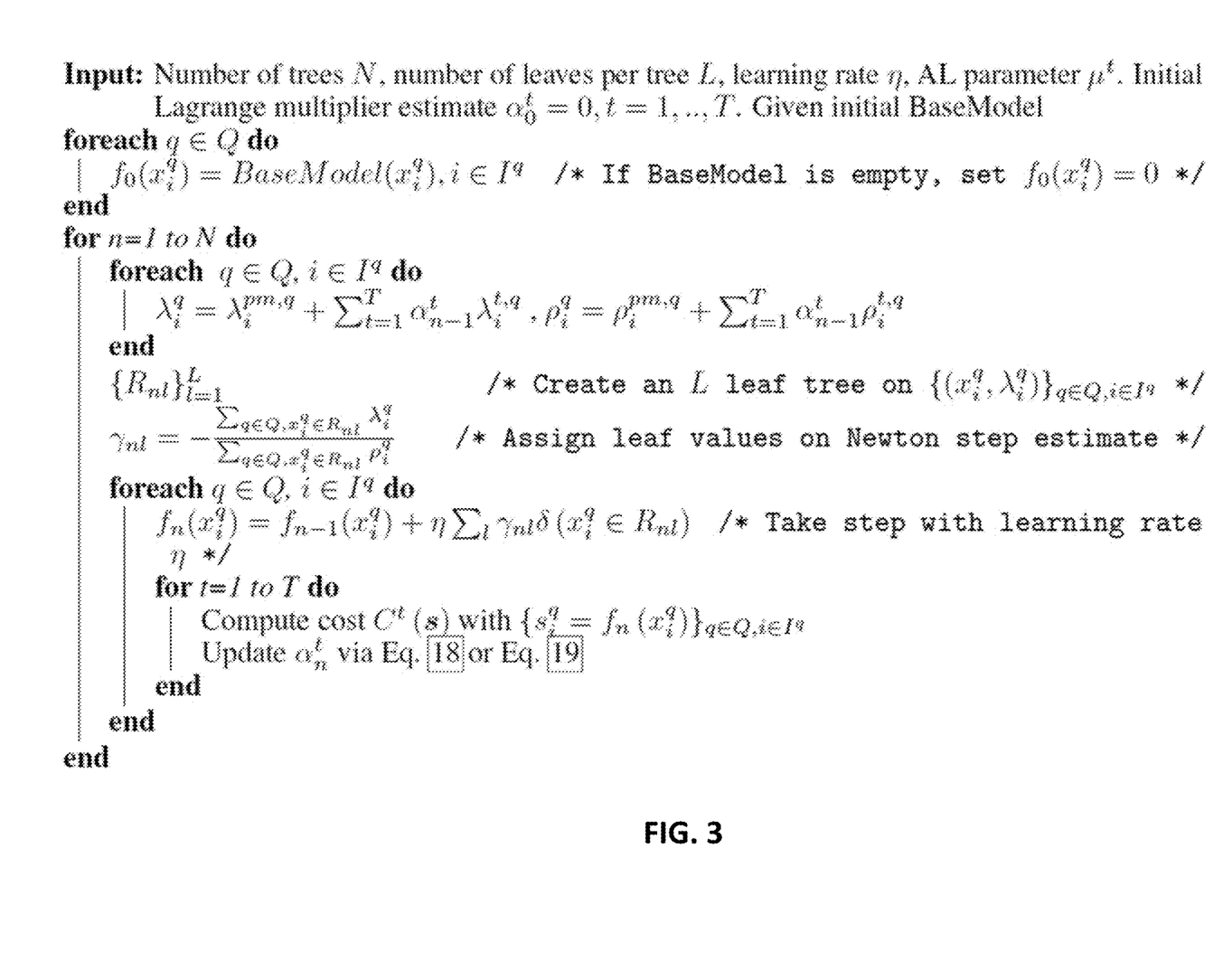
FIG. 3 depicts pseudocode illustrating an example integration of the Augmented Lagrangian into the LambdaMART ranking algorithm, in accordance with various embodiments of the present disclosure.

Both AL and LambdaMART algorithms run by iterations. Accordingly, the two methods may be integrated. AL step calculation is used to update a at each Boosting iteration. Accordingly, the AL iteration index k is set equal to the Boosting iteration index n. As for the AL parameter $\mu_k^t$, in some examples, the parameter may be fixed ($\mu_k^t = \mu^t$). A variant of algorithm could increase the value of $\mu^t$ as iterations proceeds. FIG. 3 depicts commented pseudocode that can be used to integrate the AL methodology into decision tree construction using LambdaMART.

The additional component to the original LambdaMART at the n-th iteration step is the gradient computation: $\lambda_i^q$, $\lambda_i^q$ and update of $\alpha_n^t$. Although AL integration into the LambdaMART algorithm is explicitly shown and described, the modification of existing solvers (e.g., GBM in R, XGBoost, LightGBM, etc.) is readily accomplished in accordance with the various techniques described above. Once the decision trees are generated using, for example, the techniques depicted in FIG. 3 and described above, the decision trees are usable to rank search results while optimizing for multiple objectives. As described in FIG. 3 a learning rate may be selected for the GBT decision trees. Additionally, the models generated may be updated systematically using the above techniques without requiring manual tuning of parameters and/or hyperparameters.

Figure 4:
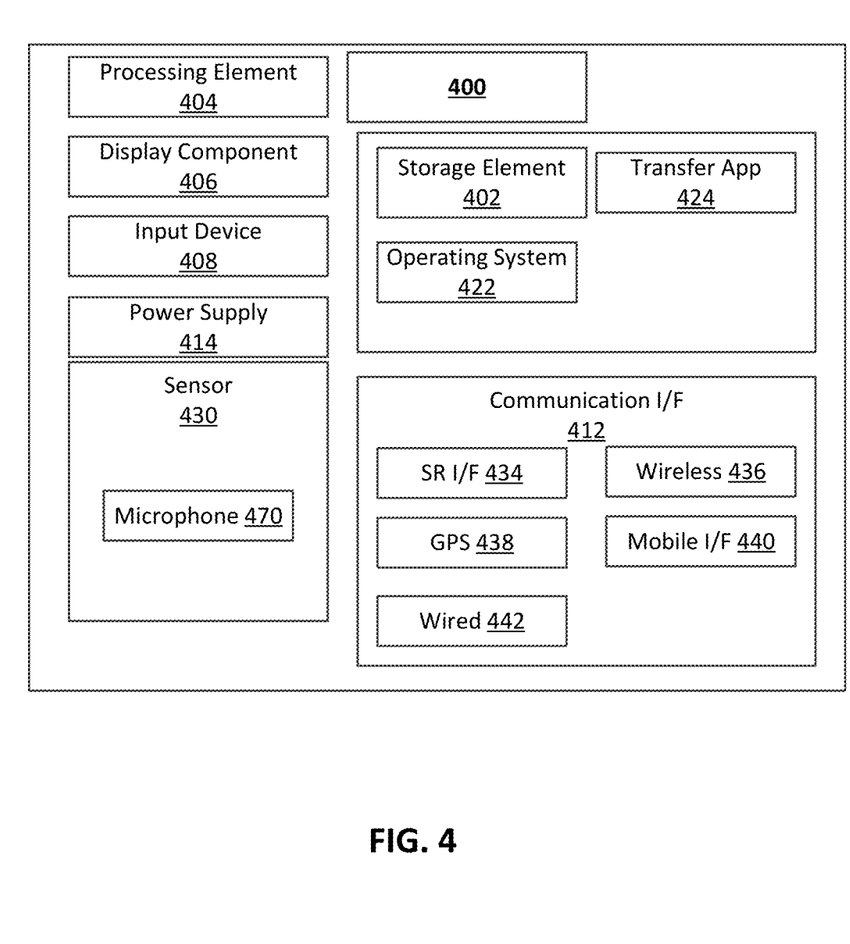
FIG. 4 is a block diagrams showing an example architecture of a computing device that may be used in accordance with various embodiments described herein.

FIG. 4 is a block diagram showing an example architecture 400 of a computing device used to implement multi-objective ranking system 102, in accordance with various aspects of the present disclosure. It will be appreciated that not all devices will include all of the components of the architecture 400 and some user devices may include additional components not shown in the architecture 400. In an example embodiment, the architecture 400 includes one or more processing elements 404 for executing instructions and retrieving data stored in a storage element 402. The processing element 404 comprises at least one processor. Any suitable processor or processors may be used. For example, the processing element 404 may comprise one or more digital signal processors (DSPs). The storage element 402 can include one or more different types of memory, data storage, or computer-readable storage media devoted to different purposes within the architecture 400. In an example embodiment, the storage element 402 comprises flash memory, random-access memory, disk-based storage, etc. Different portions of the storage element 402, for example, are used for program instructions for execution by the processing element 404, storage of images or other digital works, and/or a removable storage for transferring data to other devices, etc. Additionally, storage element 402 may store various costs, iterative penalty values $\alpha$, and/or other values determined using the above-described techniques when updating the models by multi-objective ranking system 102.

The storage element 402 may also store software for execution by the processing element 404. An operating system 422 may provide the user with an interface for operating the computing device and may facilitate communications and commands between applications executing on the architecture 400 and various hardware thereof. In an example embodiment, a transfer application 424 is configured to receive images, audio, and/or video from another device (e.g., a mobile device, image capture device, and/or display device) and/or from microphone 470 included in the architecture 400.

When implemented in some user devices, the architecture 400 comprises a display component 406. The display component 406 can comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display input images and/or segmentation masks generated in accordance with the various techniques described herein.

The architecture 400 may also include one or more input devices 408 operable to receive inputs from a user. Example input devices 408 include a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

In an embodiment, the communication interface 412 comprises one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. In an embodiment, a short range interface 434 is configured to communicate using one or more short range wireless protocols such as, for example, near field communications (NFC), Bluetooth®, Bluetooth LE, etc. In an embodiment, a mobile interface 440 is configured to communicate utilizing a cellular or other mobile protocol. A Global Positioning System (GPS) interface 438 may be in communication with one or more earth-orbiting satellites or other suitable position-determining systems to identify a position of the architecture 400. In an embodiment, a wired communication module 442 is configured to communicate according to the USB protocol or any other suitable protocol.

The architecture 400 may also include one or more sensors 430 such as, for example, one or more position sensors, image sensors, and/or motion sensors. A microphone 470 is shown in FIG. 4, by way of example.

As noted above, multiple devices may be employed in a single system. In such a multi-device system, each of the devices may include different components for performing different aspects of the system's processing. The multiple devices may include overlapping components. The components of the multi-objective ranking system 102, as described herein, are exemplary, and may be located as a stand-alone device or may be included, in whole or in part, as a component of a larger device or system.

Figure 5:
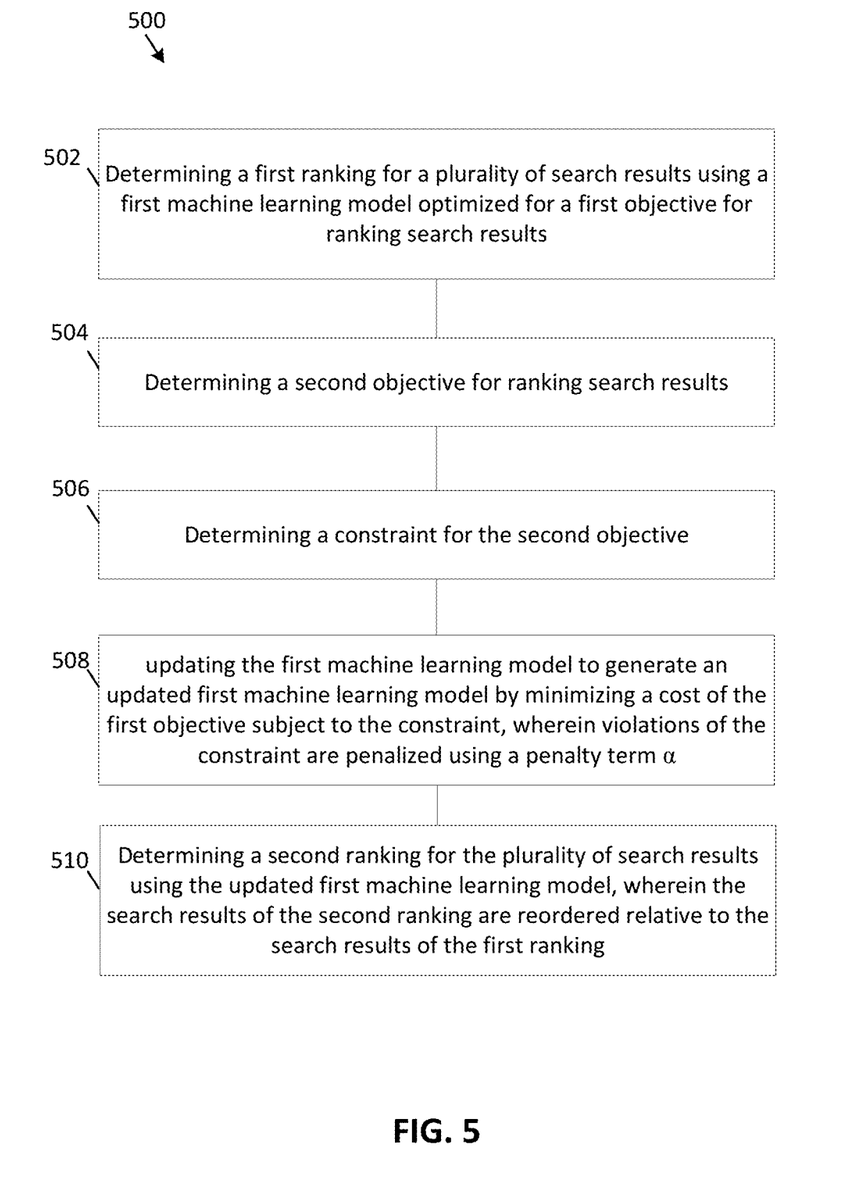
FIG. 5 is a flow diagram illustrating an example process for multi-objective ranking of search results, in accordance with various aspects of the present disclosure.

FIG. 5 is a flow diagram illustrating an example process 500 for determining when to recalibrate a state space model, in accordance with various aspects of the present disclosure.

The process 500 of FIG. 5 may be executed by multi-objective ranking system 102 and/or by a combination of multi-objective ranking system 102 and one or more other computing devices. The actions of process 500 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 500 may be described above with reference to elements of FIGS. 1-4.

In an example, processing may begin at action 502, at which a first ranking is determined for a plurality of search results using a first machine learning model optimized for a first objective for ranking search results. In an example embodiment, the first machine learning model is a ranking algorithm implemented using LambdaMART and/or another GBT ranking algorithm.

Processing may continue from action 502 to action 504, at which a second objective is determined for ranking search results. As previously described, if the first objective is related to purchase (e.g., whether or not a particular item has been purchased by the user or similar users), the second objective may be a relevance objective (e.g., a correlation between the text query and the products) and/or a business objective (e.g., a delivery estimate).

Processing may continue from action 504 to action 506, at which a constraint may be determined for the second objective. As previously described, in an embodiment, the constraint is determined by setting an upper bound associated with the cost for the second objective. The upper bound can be selected based on the cost for the second objective in the first machine learning model. For example, if the same cost is to be maintained, the upper bound can be set to the cost for the second objective from the first machine learning model. In another example, if the cost is to be decreased by 10%, the upper bound can be set to 0.9× the cost of the second objective in the first machine learning model.

Processing may continue from action 506 to action 508, at which the first machine learning model is updated to generate an updated first machine learning model by minimizing a cost of the first objective subject to the constraint (e.g., equation (11) above). In an embodiment, violations of the constraint are penalized using a penalty term $\alpha$ that is maximized during each iteration if the constraint is not satisfied to emphasize the cost of the second objective.

Processing may continue from action 508 to action 510, at which a second ranking for the plurality of search results can be determined using the updated first machine learning model. The search results of the second ranking are reordered relative to an order of the search results determined using the first machine learning model. For example, in an embodiment, the updated first machine learning model emphasizes the second objective, and the second ranking ranks those search results that satisfy the second objective higher relative to those search results that do not satisfy the second objective.

Figure 6:
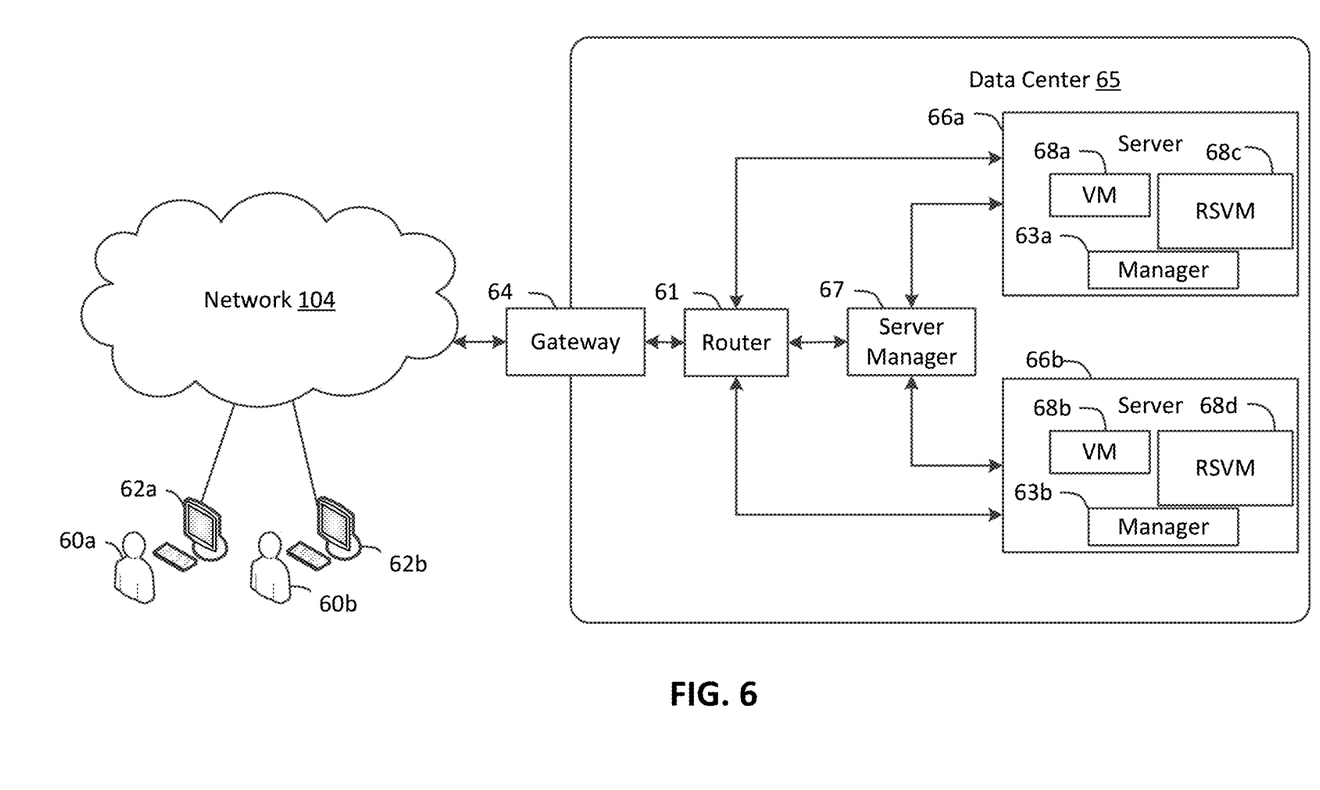
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment in which the embodiments described herein may be implemented. For example, the computing environment of FIG. 6 may be used to provide ranking of search results as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the multi-objective ranking system 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of updating a machine learning model based on multiple objectives, the method comprising:
    determining a primary objective for updating the machine learning model;
    determining a first cost for the primary objective;
    determining a secondary objective for updating the machine learning model;
    determining a second cost for the secondary objective;
    determining a Lagrangian function for the machine learning model, the Lagrangian function including the first cost and the second cost;
    determining a gradient of the Lagrangian function;
    determining a penalty term for the secondary objective using the gradient;

solving an optimization problem using the first cost for the primary objective and by applying the penalty term to a constraint related to the second cost;

generating at least one decision tree using a gradient boosting algorithm according to a solution to the optimization problem; and ranking a plurality of search results according to the at least one decision tree.

2. The computer-implemented method of claim 1, further comprising:

selecting an upper bound for the second cost, wherein the upper bound is selected as a percentage of the second cost for a previous iteration of the machine learning model;

determining, during the updating of the machine learning model, that the second cost is less than the upper bound; and setting the penalty term to zero.

3. The computer-implemented method of claim 1, further comprising:

minimizing the first cost for the primary objective during the updating of the machine learning model; and maximizing the penalty term for the secondary objective during iterations of the updating of the machine learning model.

4. A computer-implemented method of ranking search results, the method comprising:

receiving, from a first user computing device, a first search query by a search engine of an online retailer;

determining a first ranking for a plurality of search results using a first machine learning model optimized for a first objective for ranking search results;

sending the first ranking for the plurality of search results for display on the first user computing device;

determining a second objective for ranking search results;

determining a constraint for the second objective;

updating the first machine learning model to generate an updated first machine learning model by minimizing a cost of the first objective subject to the constraint, wherein violations of the constraint are penalized using a penalty term;

receiving, from a second user computing device, a second search query by the search engine of the online retailer;

determining a second ranking for the plurality of search results using the updated first machine learning model, wherein the plurality of search results of the second ranking are reordered relative to the plurality of search results of the first ranking; and sending the second ranking for the plurality of search results for display on the second user computing device.

5. The method of claim 4, further comprising determining an upper bound for the second objective based at least in part on a first cost of the second objective for the first machine learning model.

6. The method of claim 5, further comprising defining the constraint as a second cost of the second objective being less than or equal to the upper bound.

7. The method of claim 4, further comprising:

determining a Lagrangian function for the cost of the first objective subject to the constraint;

determining a gradient of the Lagrangian function; and determining the penalty term using the gradient of the Lagrangian function.

8. The method of claim 7, further comprising determining a number of decision trees fitted to the gradient of the Lagrangian function.

9. The method of claim 7, further comprising determining the penalty term using a stationary condition of the gradient of the Lagrangian function.

10. The method of claim 4, wherein:

the first ranking for the plurality of search results includes a first search result ranked higher than a second search result based on the first objective; and the second ranking for the plurality of search results includes the second search result ranked higher than the first search result based on the first objective and based on the second objective.

11. The method of claim 4, further comprising:

determining an Augmented Lagrangian function comprising the penalty term; and integrating the Augmented Lagrangian function into a Gradient Boosting algorithm by setting a first iteration index of the Augmented Lagrangian function equal to a second iteration index of the Gradient Boosting algorithm.

12. The method of claim 4, further comprising:

selecting a first number of decision trees for the updated first machine learning model; and selecting a number of leaves for each decision tree of the first number of decision trees.

13. The method of claim 4, further comprising selecting a learning rate for the updated first machine learning model.

14. A computing device, comprising:

at least one processor; and a non-transitory computer-readable memory storing instructions that, when executed by the at least one processor, are effective to program the at least one processor to:

receive, from a first user computing device, a first search query by a search engine of an online retailer;

determine a first ranking for a plurality of search results using a first machine learning model optimized for a first objective for ranking search results;

send the first ranking for the plurality of search results for display on the first user computing device;

determine a second objective for ranking search results;

determine a constraint for the second objective;

update the first machine learning model to generate an updated first machine learning model by minimizing a cost of the first objective subject to the constraint, wherein violations of the constraint are penalized using a penalty term;

receive, from a second user computing device, a second search query by the search engine of the online retailer;

determine a second ranking for the plurality of search results using the updated first machine learning model, wherein the plurality of search results of the second ranking are reordered relative to the plurality of search results of the first ranking; and send the second ranking for the plurality of search results for display on the second user computing device.

15. The computing device of claim 14, the non-transitory computer-readable memory storing further instructions, that when executed by the at least one processor are further effective to program the at least one processor to:

determine an upper bound for the second objective based at least in part on a first cost of the second objective for the first machine learning model.

16. The computing device of claim 15, the non-transitory computer-readable memory storing further instructions, that when executed by the at least one processor are further effective to program the at least one processor to define the constraint as a second cost of the second objective being less than or equal to the upper bound.

17. The computing device of claim 14, the non-transitory computer-readable memory storing further instructions, that when executed by the at least one processor are further effective to program the at least one processor to:
  determine a Lagrangian function for the cost of the first objective subject to the constraint;
  determine a gradient of the Lagrangian function; and
  determine the penalty term using the gradient of the Lagrangian function.

18. The computing device of claim 17, the non-transitory computer-readable memory storing further instructions, that when executed by the at least one processor are further effective to program the at least one processor to:
  determine a number of decision trees fitted to the gradient of the Lagrangian function.

19. The computing device of claim 17, the non-transitory computer-readable memory storing further instructions, that when executed by the at least one processor are further effective to program the at least one processor to:
  determine the penalty term using a stationary condition of the gradient of the Lagrangian function.

20. The computing device of claim 14, wherein:
  the first ranking for the plurality of search results includes a first search result ranked higher than a second search result based on the first objective; and
  the second ranking for the plurality of search results includes the second search result ranked higher than the first search result based on the first objective and based on the second objective.

* * * * *